(No Model.) 3 Sheets—Sheet 2.

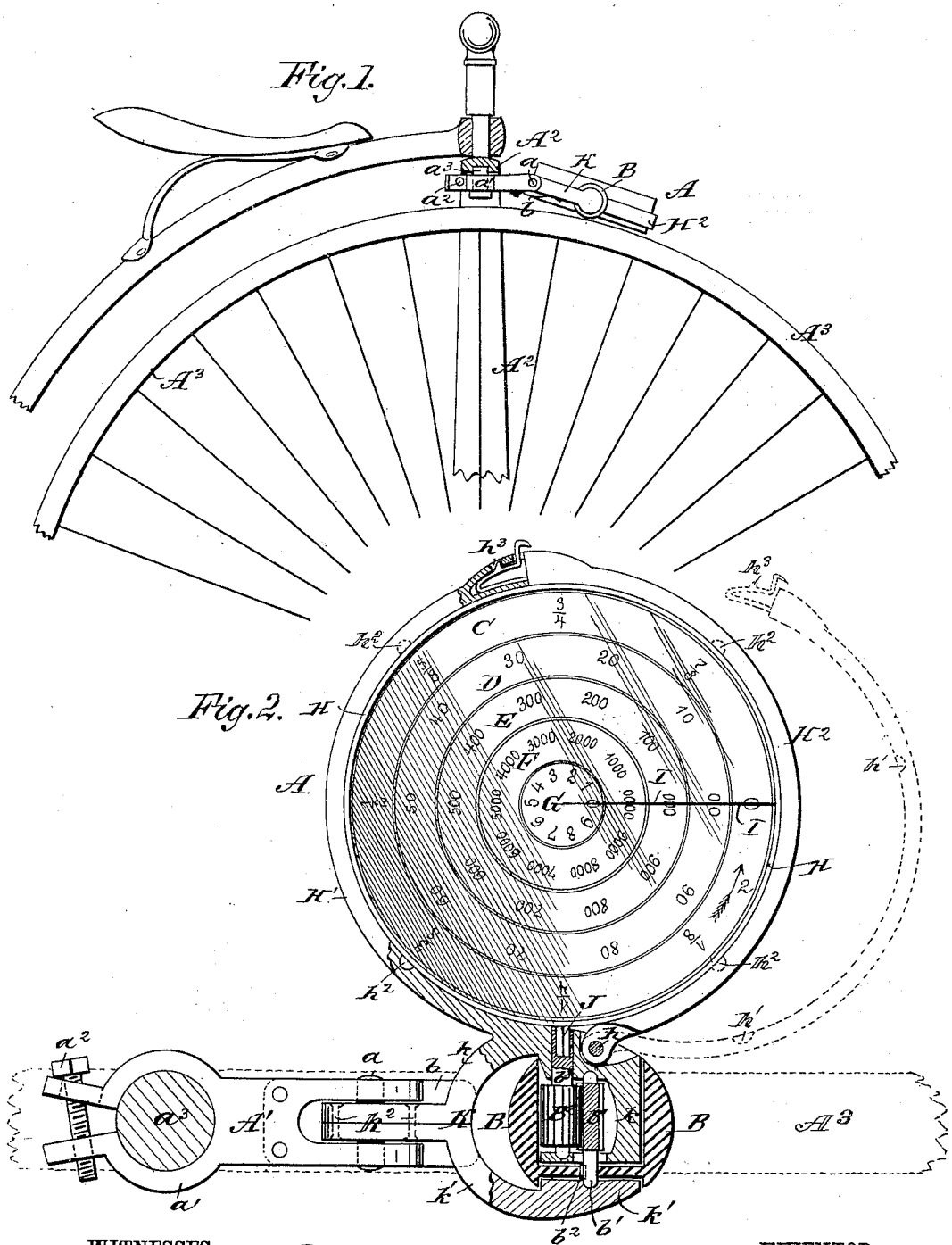

B. F. HUTCHES, Jr.
ODOMETER.

No. 321,365. Patented June 30, 1885.

WITNESSES:

INVENTOR:
B. F. Hutches Jr.
BY Munn & Co.
ATTORNEYS.

(No Model.) 3 Sheets—Sheet 3.

B. F. HUTCHES, Jr.
ODOMETER.

No. 321,365. Patented June 30, 1885.

WITNESSES:

INVENTOR:
B. F. Hutches Jr.
BY Munn & Co.
ATTORNEYS.

UNITED STATES PATENT OFFICE.

BENJAMIN F. HUTCHES, JR., OF GALVESTON, TEXAS.

ODOMETER.

SPECIFICATION forming part of Letters Patent No. 321,365, dated June 30, 1885.

Application filed April 1, 1885. (No model.)

*To all whom it may concern:*

Be it known that I, BENJAMIN F. HUTCHES, Jr., of Galveston, in the county of Galveston and State of Texas, have invented a new and Improved Odometer, of which the following is a full, clear, and exact description.

My invention relates to odometers, and has for its object to provide a simple, compact, reliable instrument of this class which will register the actual distance traveled by a bicycle, tricycle, carriage, car, or other vehicle to which the instrument may be attached, and one which will register the distance traveled in both directions, or forward and backward, without requiring special adjustment of the registering mechanism.

The invention consists in particular constructions and combinations of parts of the odometer, all as hereinafter fully described and claimed.

Reference is to had to the accompanying drawings, forming part of this specification, in which similar letters of reference indicate corresponding parts in all the figures.

Figure 3:
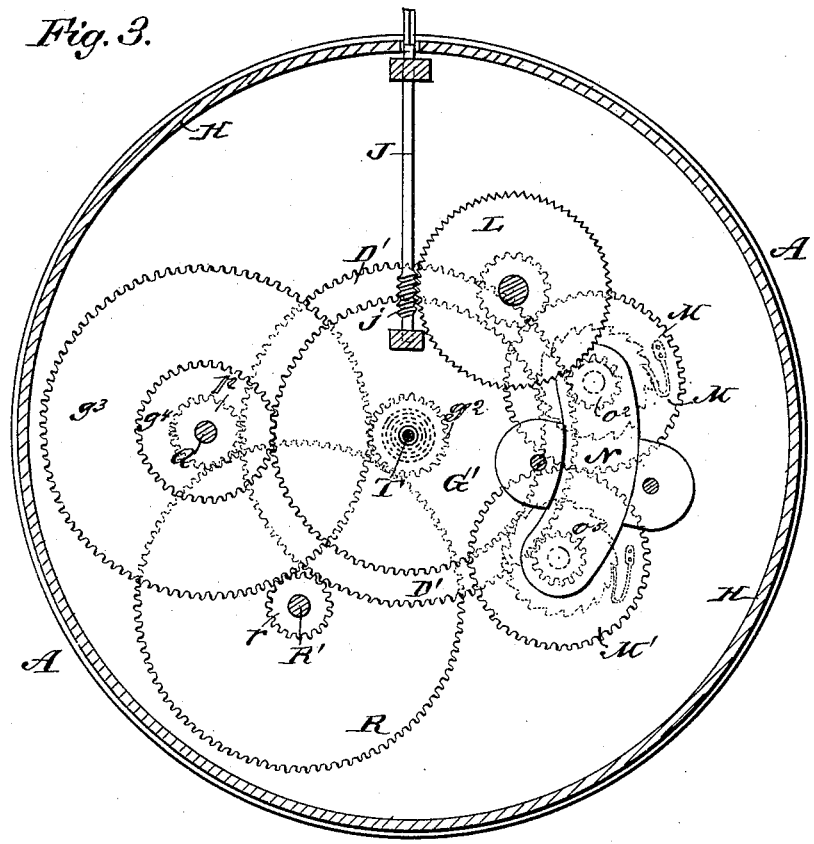
Figure 4:
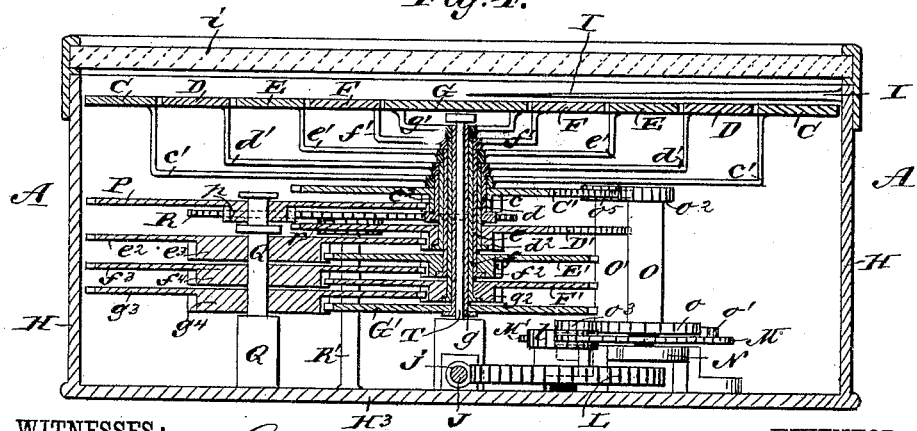
Figure 5:
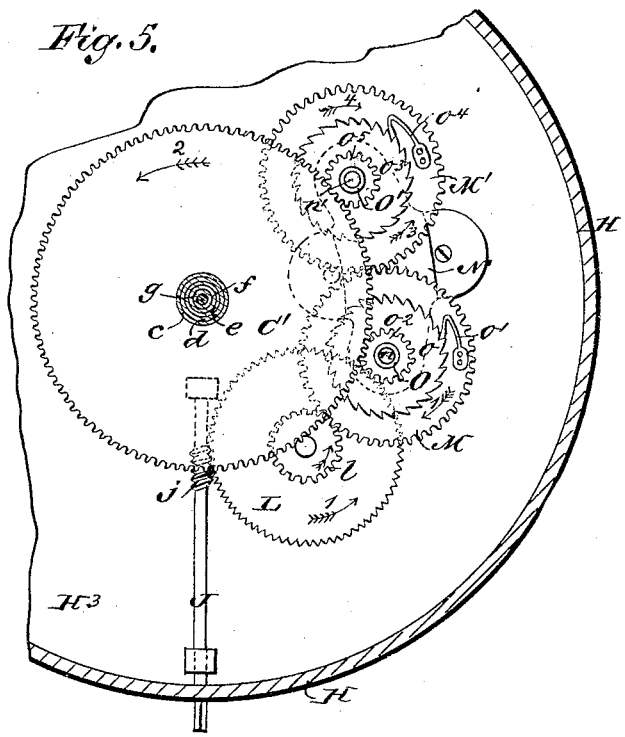
Figure 6:
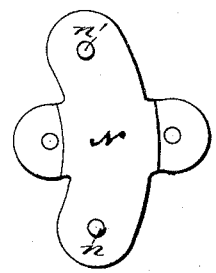
Figure 7:
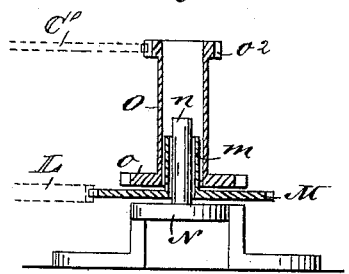
Figure 8:
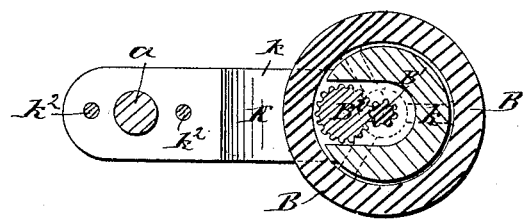

Figure 1 is a sectional side elevation of part of a bicycle with my improved odometer attached in operative position. Fig. 2 is a sectional plan view of the odometer, drawn to a larger scale, and with part of the bicycle-wheel in dotted lines. Fig. 3 is a bottom plan view, with the dial-case in section, and showing the gearing by which the several dials of the odometer are turned. Fig. 4 is a transverse section of the dial-case, dials, and the dial-operating mechanism. Fig 5 is a top plan view of part of the dial-gearing; and Figs. 6, 7, and 8 are detail views.

The letter A indicates the odometer, which is pivoted by a pin, $a$, to a clevis or yoke, A', having a split or forked rear end outside of an eye, $a'$, which eye is clamped by the screw $a^2$ to a stud or pin, $a^3$, fixed in the head of the arch-bar or forked frame A² of the bicycle, in which frame the main wheel A³ of the machine is journaled in any approved way. Thus arranged the odometer will turn with the main wheel, a spring, $b$, serving to hold the wheels B A³ in contact, so that the distance-registering mechanism and dials will be operated as the bicycle-wheel rotates.

I place the dials C D E F G of the odometer and their operating mechanism within a suitable case, H, which is held in a frame consisting of two parts or sections, H' H², pivoted to each other by a pin, $h$, and the frame has recesses $h'$, into which studs or pins $h^2$ on the case H enter to hold the case to the frame when the frame is closed around the case, and its parts H' H² are locked together by a spring-catch, $h^3$, or other suitable device. (See Fig. 2.)

At I is shown a pointer, which is fixed to case H and projects over the several dials to serve as a starting-point or zero, from which the distance traveled by the bicycle may be read off on the dials, and a glass plate, $i$, fitted over the dials protects them and their operating mechanisms from moisture and dust.

I gear the drive-wheel B with the worm-shaft J of the dial-operating mechanism by means of a pinion, B', to the shaft $b'$ of which the wheel B is keyed, as at $b^2$, Fig. 2, and the pinion B' meshes with another pinion, B², the shaft $b^3$ of which is fitted to the squared or flat-sided end of the worm-shaft J.

The wheel B and gears B' B² are supported in a head, K, held to one of the parts of the frame which supports the dial-case H—the part H', for instance, as shown—and this head K consists of a part or section, $k$, fixed to said part H', and in which the ends of the shaft $b^3$ have bearings in any suitable way. The inner end of shaft $b'$ has a bearing in part $k$ and an outer bearing in part $k'$ of head K, said part $k'$ being made separate from part $k$ and connected to it by rivets or screws $k^2$, which pass through lugs of parts $k$ $k'$ and bind said parts together, so as to confine wheel B and pinions B' B², and the riveted lugs of head K enter between lugs of the yoke A' to receive the pivot-pin $a$, all as clearly shown in Figs. 2 and 8.

The drive-wheel B preferably is to be about three inches in circumference, and the gears B' B² will be proportioned so that four revolutions of wheel B, measuring a distance of one foot traveled over by the vehicle, will give one complete turn to the worm-shaft J of the dial mechanism, the gearing thus being disposed in a compact arrangement which has little weight; but, if desired, a drive-wheel about four inches in diameter may be fitted to the worm-shaft J, so as to run against the vehicle-wheel A³ to measure off one foot at each revolution; or the drive-wheel may have any other desired proportions with corresponding gearing to turn shaft J once for every foot of ground traveled over by the vehicle.

I describe the dial-operating gearing as follows: The worm-shaft J has a worm, $j$, which engages a worm-wheel, L, which is journaled on a stud fixed to the base-plate H³ of the case H, and to wheel L is fixed a pinion, $l$, which meshes with a gear-wheel, M, which is journaled on a pin, $n$, fixed to one end of a bridge-piece, N, secured to plate H³. On the elongated hub or sleeve $m$ of gear-wheel M—or it may be on pin $n$—is fitted loosely the sleeve O, which has a ratchet-wheel, $o$, fixed to its lower end. A spring-pawl, $o'$, fixed to wheel M, is adapted to engage the ratchet $o$, and a pinion, $o^2$, fixed to the top of sleeve O, engages a gear-wheel, C′, which is journaled by its central sleeve, $c$, on the sleeve $d$, which supports the second dial, D, as hereinafter explained. The sleeve $c$ of gear-wheel C′ is connected by arms $c'$ with the outer dial, C, which is graduated in fractions of a mile up to one mile, which distance it will register by one complete revolution. The worm $j$ is geared to the wheel C′ as five thousand two hundred and eighty is to one, or as the number of feet in a mile is to a mile; hence the worm will rotate five thousand two hundred and eighty times to one revolution of the dial C.

On a pin, $n'$, rising from the farther end of bridge-piece N, is placed loosely by a sleeve, O′, the gear-wheel M′, and on the bearing or sleeve of wheel M′ is fitted loosely a ratchet-wheel, $o^3$, with the teeth of which a spring-pawl, $o^4$, fixed to wheel M′, is adapted to engage, and at the top of sleeve O′ is fixed a pinion, $o^5$, which engages the teeth of the gear-wheel C′ of dial C. The gearing M′ O′ $o^3$ $o^4$ $o^5$ is similar to the gearing M O $o$, $o'$ $o^2$, above described, and the wheels M M′ gear with each other, and the pinions $o^2$ $o^5$ gear with the dial drive-wheel C′.

The object of the last above-described duplicate gearing is to cause the mile-dial C to turn in one direction toward the left, whichever way the worm $j$ may be driven by the forward or backward running of the vehicle. For instance, when the bicycle is traveling forward the worm-shaft J will be turned to rotate the wheels L M in direction of their respective arrows 1 1 in Fig. 5, and the pawl $o'$ will engage the ratchet $o$ and carry the pinion $o^2$ around to turn the gear-wheel C′, with its dial C, in direction of their arrows 2 2, or toward the left, to register the distance by means of pointer I, (see Figs. 1 and 2,) and at the same time the wheel M′ will be turned by wheel M in direction of its arrow 3, while the pinion $o^5$ and ratchet $o^3$ are turned in the opposite direction by the gear-wheel C′, the teeth of ratchet $o^3$ then slipping backward past the pawl. If for any reason the bicycle should be run backward, it is evident that the worm-shaft J will also turn backward, which will turn the wheels L M in the reverse direction of arrows 1 1, and the wheel M′ will be driven in direction of its arrow 4, so that the dial gear-wheel C′ will then be driven by the pinion $o^5$ in direction of its arrow 2, as before, and the ratchet O will be turned by the pinion $o^2$ in a reverse direction, so the ratchet-teeth will slip past the pawl $o'$, as will readily be understood.

The gear-wheels giving motion to the dials D E F G are geared to the drive-wheel C′ of dial C, to receive motion therefrom, as follows: To the sleeve $c$ of gear-wheel C′ is fixed a pinion, $c^2$, which gears with a toothed wheel, P, journaled on a post, Q, fixed to plate H³ of the case, and the wheel P carries fixedly a pinion, $p$, which meshes with a gear-wheel, R, journaled to a post, R′, rising from plate H³, and wheel R carries a pinion, $r$, which meshes with a gear-wheel, D′, which is connected to the sleeve $d$ of dial D for giving motion thereto in the same direction as that in which dial C rotates, which arrangement of gearing revolves dial D once for every one hundred revolutions of dial C, said dial D being graduated to register miles up to one hundred miles for each revolution.

The sleeve $d$ is fitted in the sleeve $c$, and is connected by arms $d'$ with the dial D, and the sleeve $d$ is fitted over a sleeve, $e$, which is connected by arms $e'$ with the dial E. To the gear-wheel D′ is fixed a pinion, $d^2$, which meshes with a gear-wheel, $e^2$, which is journaled on post Q, and carries a pinion, $e^3$, which meshes with the gear-wheel E′, which is fixed to sleeve $e$ and gives motion to dial E at one-tenth the speed of dial D, the dial E thus registering hundreds of miles up to one thousand miles.

The sleeve $e$ is fitted on the sleeve $f$, to which latter sleeve the dial F is connected by arms $f'$, and the gear-wheel E′ carries a pinion, $f^2$, which gears with a wheel, $f^3$, on post Q, and wheel $f^3$ has a pinion, $f^4$, which meshes with the gear-wheel F′, fixed to sleeve $f$ for giving motion to dial F at one-tenth the speed of dial E, the dial E thus registering thousands of miles up to ten thousand miles.

The sleeve $f$ is fitted loosely on the sleeve $g$, to which the dial G is connected by arms $g'$, and the gear-wheel F′ carries a pinion, $g^2$, which gears with a wheel, $g^3$, on post Q, and wheel $g^3$ carries a pinion, $g^4$, which meshes with the gear-wheel G′, fast on sleeve $g$, and whereby motion is given dial G at one-tenth the speed of dial F, the dial G thus registering tens of thousands of miles up to one hundred thousand miles.

The sleeve $g$ has its bearing on a central post, T, secured to case-plate H³, the post thus serving to support the sleeves of all the dials, and the sleeves will have friction-fit one upon the other, so they will turn independently by their respective gearing, and also to allow the dials to be set back to zero at any time by turning them by hand.

The odometer may of course be fitted with a less number of dials than the five shown and above described, and driving-gearing therefor, for registering a less total distance than one hundred thousand miles.

I show the odometer attached to a bicycle, so as to be driven by contact of its wheel B with the main wheel of the vehicle; but it may be attached to the bicycle-frame, so as to be driven by the trailing or follow wheel of the bicycle; and the odometer may be attached to carriages, railway-cars, or other vehicles, so as to be operated for registering the distance traveled over either by contact with the vehicle-wheels or with the track or road over which the vehicle runs, as will readily be understood.

Having thus described my invention, what I claim as new, and desire to secure by Letters Patent, is—

1. In an odometer, the combination, with the casing or frame supporting within it the distance-registering dials and their driving-gearing and the worm-shaft J of said gearing, of the head K, held to said frame, the friction drive-wheel B, journaled on said head, and the pinions B' B², journaled in the head and within the drive-wheel B, substantially as herein set forth.

2. In an odometer, the frame for support of the dial-case and dial-gearing, constructed with hinged parts H' H², and a head, K, formed of connected parts $k\ k'$, and fitted with the friction drive-wheel B, adapted for connection with the prime shaft of the dial-operating mechanism, and said head being pivoted to a yoke, A', adapted for attachment to a vehicle, substantially as herein set forth.

3. In an odometer, the dial-case-supporting frame made with hinged parts H' H², a head, K, fitted with friction drive-wheel B and pinions B' B², and adapted for connection with the prime shaft of the dial-operating mechanism, and said head pivoted to a yoke, A', provided with an eye, $a'$, and a split end fitted with a clamping device, and the spring $b$, substantially as herein set forth.

4. In an odometer, the combination, with the mile-dial C and its gear-wheel C', of the wheels M M', meshing with each other and carrying, respectively, the spring-pawls $o'\ o^4$, and the sleeves O O', supported on wheels M M', and provided, respectively, with the ratchets $o\ o^3$ and pinions $o^2\ o^5$, whereby the dial gear-wheel C' will be rotated in the same direction, whichever way the prime mover actuating the gearing may turn, substantially as herein set forth.

5. In an odometer, the combination, with the worm-shaft J, worm $j$, and a wheel or gearing for imparting motion to said shaft by contact with a rotating body or the ground, of a worm-wheel, L, a gear-wheel, M, having a pawl, $o'$, a loose sleeve, O, held over wheel M and carrying the ratchet $o$, and a pinion, $o^2$, meshing with the dial gear-wheel C', and a gear-wheel, M', meshing with wheel M, and having a pawl, $o^4$, the loose sleeve O', held over wheel M' and carrying the ratchet $o^3$, and the pinion $o^5$, meshing with dial-wheel C', whereby dial C will be rotated in one direction, whichever way the worm-shaft and worm may turn, substantially as herein set forth.

BENJAMIN F. HUTCHES, JR.

Witnesses:
C. H. HARRIS,
GEO. WILKINSON.